Patented May 20, 1941

2,242,553

UNITED STATES PATENT OFFICE 2,242,553

TREATMENT OF HYDROCARBONS

Charles L. Thomas and Herman S. Bloch, Chicago, Ill., assignors to Universal Oil Products Company, Chicago, Ill., a corporation of Delaware No Drawing. Application November 30, 1938, Serial No. 243,202

10 Claims. (Cl. 196—50)

This invention relates to the conversion of hydrocarbons such as petroleum fractions and hydrocarbonaceous oils generally including synthetic oils from numerous carbon-containing sources. More particularly, the conversion involves hydrocarbons which may be vaporized without substantial decomposition.

More specifically the present invention involves conversion of hydrocarbons in the presence of specific types of catalytic materials which function to selectively promote the formation of very high antiknock gasoline. The preferred catalysts are prepared synthetically by definite steps of procedure which are specific in the production of catalysts of high activity for prolonged use.

The art of pyrolytically cracking and reforming hydrocarbons to produce high antiknock gasoline is very extensive and it is recognized that most of the basic principles involved are known and that particular commercial processes have been developed which embody these principles. On the other hand, where cracking and reforming of hydrocarbons are carried out catalytically, knowledge as to the application of catalysts is largely upon the same basis as it is in other catalytic fields, that is, it is largely empirical. A large number of catalysts tried out in cracking and reforming operations accelerate reactions leading to the formation of gas rather than of high anti-knock gasoline predominantly, this being particularly evidenced by reduced metal catalysts such as iron or nickel and also certain metal oxide catalysts which accelerate principally dehydrogenation reactions. The reduced metal catalysts, in particular, have the disadvantage of being sensitive to sulphur poisoning and are quickly coated with carbonaceous materials which render them practically inert. This deposition of carbonaceous materials is frequently related to the type of decomposition selectively accelerated by the catalyst.

The present invention is concerned with converting hydrocarbon fractions in the presence of catalytic materials which are specifically adapted to accelerate the conversion of petroleum fractions and other hydrocarbonaceous materials so as to produce large yields of high antiknock gasoline boiling range fractions together with gaseous by-products which contain unusually high percentages of readily polymerizable olefins useful in further increasing the gasoline yields. The preferred catalysts for the process are characterized by selectivity in accelerating gasoline-forming reactions rather than light-gas-forming reactions, by their selectivity in producing high antiknock gasoline, by their refractory character which enables them to retain their catalytic properties over extended periods of time under high temperature conditions of use and regeneration, by their ease and simplicity of manufacture and their exact reproducibility.

In one specific embodiment the present invention comprises subjecting petroleum fractions at elevated temperatures and at atmospheric or relatively low superatmospheric pressures to contact with catalytic materials comprising synthetically prepared composite masses of silica ($SiO_2$), alumina ($Al_2O_3$), an thoria ($ThO_2$) producing concurrently relatively high yields of high antiknock gasoline and gas containing relatively high percentages of readily polymerizable olefins.

According to the present invention hydrocarbon fractions, for example, a petroleum gas oil or a straight-run gasoline may be processed at temperatures of the usual high pressure pyrolytic cracking temperature range but at substantially lower pressures while in contact with silica-alumina-thoria catalysts. These catalysts may be prepared by a number of alternative methods which have certain necessary features in common as will be subsequently described. Generally speaking, however, the catalysts may be considered to comprise an intimate molecular admixture of silica, alumina and thoria, all of the components of which indicate more or less low activity individually but in the aggregate display high activity. The activity is not an additive function, it being relatively constant for a wide range of proportions of the components whether in molecular or fractions of molecular proportions. No one component can be determined as the one component for which the remaining components may be considered as the promoters according to conventional terminology, nor can any one component be determined as the support and the others the catalyst proper.

According to one general method of preparation used before drying treatment, the preferred catalyst may be prepared by precipitating silica from a solution as a gel and subsequently admixing or depositing the alumina and thoria upon the hydrated silica. One of the more convenient methods of preparing the silica gel is to acidify an aqueous solution of sodium silicate by the addition of an acid such as hydrochloric acid, for example. The excess acid and the concentration of the solution in which the precipitation is brought about determine in some measure the suitability of the silica hydrogel for subsequent deposition of alumina and thoria. In general, suitable hydrated silica may be produced by the use of dilute solutions of sodium silicate and the addition of a moderate excess of acid whereby the desired active silica gel is obtained and conditions of filtering and washing are at an optimum.

After precipitating the silica it is treated and washed to substantially remove alkali metal ions. It is not known whether the alkali metal ions in such as sodium are present in the primary gel in chemical combination or in an adsorbed state but it has been definitely determined that their removal is necessary if catalysts suitable for prolonged use in accelerating hydrocarbon conversion reactions are to be obtained. It is possible that the presence of the alkali metal impurities causes a sintering or fusion of the surfaces of the catalyst at elevated temperatures so that the porosity is much reduced with corresponding reduction in effective surface. Alkali metal ions may be removed by treating with solutions of acidic materials, ammonium salts generally, or salts of multivalent metals, more preferably those of aluminum and thorium. When treating with acids, as for example, with hydrochloric acid, the acid extracts the alkali metal impurities in the silica gel. The salts formed and acid are then substantially removed by water washing treatment. Where ammonium salts or salts of multivalent metals are used, the ammonium or multivalent metals apparent displace the alkali metal impurities present in the composite and the alkali metal salts formed together with the major portion of the multivalent salts, are removed in the water washing treatment. Some of the multivalent metals introduced into the silica hydrogel in the purifying treatment may become a permanent part of the composite whereas, in the treatment with ammonium salts small amounts of the ammonium salts remaining after the washing process will be driven off in subsequent treatment at elevated temperatures.

In one of the preferred methods of compositing the hydrated materials, the purified precipitated hydrated silica gel may be suspended in a solution of thorium and aluminum salts in the desired proportions and thoria and alumina deposited upon the suspended silica by the addition of volatile basic precipitants such as ammonium hydroxide, for example, or ammonium carbonate, ammonium hydrosulfide, ammonium sulfide, or other volatile basic precipitants such as organic bases may be employed. According to this method, the purified silica gel may be suspended in a solution of thorium and aluminum chlorides, for example, and the hydrated thoria and hydrated alumina precipitated by the addition of ammonium hydroxide. In this example, the alumina and thoria were co-precipitated. Good results may also be obtained by depositing one of these components prior to the remaining component.

Alternately the purified hydrated silica gel may be mixed while in the wet condition with separately prepared hydrated alumina and hydrated thoria precipitated either separately or concurrently by the addition of volatile basic precipitants to solutions of salts of aluminum and thorium. The hydrated alumina and hydrated thoria thus prepared are substantially free from alkali metal ions and can be admixed with the purified silica gel. However, if alkali metal ions are incorporated as when the hydrated alumina regulated purification treatment and water washing by methods selected from those described in connection with the purification of the hydrated silica gel to remove alkali metal ions would be required. Care should be observed in the selection and concentration of reagents used so as not to dissolve unduly large amounts of alumina or thoria. As further alternatives the purified silica gel may be added to a solution of salts of aluminum and thorium and the alumina and thoria deposited by hydrolysis with or without the use of heat, or the purified silica gel may be mixed with suitable amounts of salts of aluminum and thorium as, for example, in forming a paste and heating whereby alumina and thoria are deposited upon the silica gel as a result of the decomposition of the aluminum and thorium salts.

In the methods above described a silica hydrogel free from alkali metal ions was admixed or had deposited thereon relatively pure hydrated alumina and hydrated thoria prior to drying treatment. In methods described below the hydrated silica, hydrated alumina and hydrated thoria are concurrently precipitated or admixed and treatment to remove alkali metal ions applied to the composited material prior to drying treatment either in the presence of the original reactants or subsequent to water washing. Thus, solutions of silicon compounds more usually alkali metal silicates and soluble aluminum and thorium salts may be mixed under regulated conditions of acidity or basicity to jointly precipitate hydrated silica, hydrated alumina and hydrated thoria in varying proportions. For example, solutions of sodium silicate, aluminum chloride and thorium nitrate may be mixed and alkaline or acid reagents added according to the proportions used so that a pH of 3–10 is obtained. In the cases where salts are formed, the precipitation may be brought about by addition of a volatile base as, for example, ammonium hydroxide, and alkali metal salts removed by water washing, or the composite may be treated as indicated above in connection with the purification of the hydrated silica to remove alkali metal ions. Various methods are possible for the preparation of the hydrated silica, hydrated alumina and hydrated thoria separately or in combination and the purifying treatment is necessary where alkali metal ions are present in substantial amounts.

The character and efficiency of the ultimately prepared silica-alumina-thoria catalyst will vary more or less with precipitation and/or mixing, purification treatment, ratio of components, calcining, etc., several specific examples being given. The ratio of the components may be varied within wide limits, the limiting factor being more in evidence with respect to small proportions than with larger proportions of the various components. In general, it appears that two to six mol per cent of alumina and thoria together with reference to silica may be considered an approximation of the minimum proportions. Experience has indicated superior results as to yields and octane number of gasoline product for catalysts comprising silica, alumina and thoria as compared with silica-alumina catalysts.

After the alumina and thoria have been mixed with or deposited upon the purified hydrated silica gel and water washed if desired, as described for one general method of preparation, or after the hydrated silica, hydrated alumina and to remove alkali metal ions, as described for another general method of preparation, the catalytic material may be recovered as a filter cake and dried at a temperature of the order of 240-300° F., more or less, after which it may be formed into particles of a suitable definite size ranging from powder to various formed sizes obtained by pressing and sizing or otherwise formed into desired shapes by compression or extrusion methods.

By calcining at temperatures of the order of approximately 850-1000° F., or higher, maximum activity of the catalyst is obtained and a further dehydration occurs so that, for example, after a considerable period of heating at 900° F., the water content as determined by analysis is of the order of 2-3% which is firmly fixed and does not appreciably vary either as the result of long service or a large number of reactivations at considerably higher temperatures.

Catalysts prepared by the various types of procedures outlined evidently possess a large total contact surface corresponding to a desirable porosity, the pores of the catalyst particles being of such size and shape that they do not become clogged with carbonaceous deposits after a long period of service, and are therefore not difficult to reactivate by oxidation. This structure is also retained after many alternate periods of use and reactivation as evidenced by the fact that the catalysts may be repeatedly reactivated by passing air, or other oxidizing gas, over the spent particles to burn off deposits of carbonaceous material at temperatures as high as 1400-1600° F., without material loss of catalytic activity.

In accordance with the present invention the catalysts may be conveniently utilized in cracking and reforming reactions as for example when employed as filling material in tubes or chambers in the form of small pellets or granules. In cases wherein hydrocarbon fractions readily vaporizable at moderate temperatures without extensive decomposition are employed, the average particle size may be within the approximate range of 1-10 mesh, which may apply either to pellets of uniform size and short cylindrical shapes, or to particles of irregular size and shape produced by the grinding, consolidating and sizing of the partially dehydrated materials. While the simple method of preheating a given fraction of hydrocarbon oil vapors to a temperature suitable for their cracking in contact with the catalysts and then passing the vapors over a stationary mass of catalyst particles may be employed in some cases, it may be preferable to pass the preheated vapors through banks of relatively small diameter catalyst-containing tubes in multiple connection between headers, since this arrangement of apparatus is better adapted to permit exterior heating of the catalyst tubes to compensate for the heat absorbed in the endothermic cracking reactions and to dissipate heat in the regeneration.

After the passing of the oil vapors over the catalyst, the products may be separated into material unsuitable for further cracking, intermediate insufficiently converted fractions amenable to further catalytic cracking, gasoline boiling range materials, and gases, the intermediate fractions being returned directly to admixture with the charging stock so that ultimately there is complete recycling of all fractions and maximum utilization of the charging stock for gasoline production. As an alternative mode of operation the catalyst may be suspended in a stream of oil as a powder and treated under suitable conditions of temperature, pressure and contact time.

The charging stocks may comprise hydrocarbon fractions which are vaporizable without substantial decomposition, heavier hydrocarbonaceous materials which are not readily vaporized or generally the high boiling as well as lower boiling fractions. It should be recognized that hydrocarbon mixtures of low antiknock value such as naphtha cuts, gasoline lacking in light and/or heavy ends, cracked gasoline, synthetic products, etc., may be processed according to the present invention.

The normally gaseous fraction separated from the gasoline product contains much larger proportions of readily polymerizable olefins, more particularly propene and butenes, than are usually experienced in ordinary thermal cracking and these may be readily polymerized using thermal and/or catalytic treatment to produce additional yields of gasoline which may be blended if desired with the major gasoline product produced in the process. A number of polymerizing catalysts are generally known, particularly phosphoric acid deposited on siliceous absorbent, and this and/or other polymerizing catalysts may be used to polymerize the above mentioned olefins.

The application of the present invention to cracking and reforming of hydrocarbon fractions besides being characterized by the presence of novel catalysts is further characterized by the moderate operating conditions of temperature and pressure. Temperatures employed in contact with the catalysts may be within the range of 800 to 1200° F. Substantially atmospheric pressure or moderated superatmospheric pressure up to 90 pounds per square inch or more may be used, such pressure being somewhat governed by flow conditions through the vaporizing and conversion zones and the subsequent fractionating and collecting equipment.

The following specific examples are given to illustrate the process of the invention, the method of catalyst preparation also being given. The process should not be considered as limited to these examples or to the particular catalyst preparations, these being given as illustrative of the novelty and utility of the invention.

A catalyst was prepared as following having the following composition—

$$100SiO_2 : 5Al_2O_3 : 0.5ThO_2.$$

A solution of commercial sodium silicate was prepared corresponding to 480 grams of $SiO_2$ in 7 liters of water. To this was added slowly while agitating 1350 cc. of dilute hydrochloric acid solution (containing 562 cc. of concentrated acid). A silica hydrogel was formed which was directed to a filter and subsequently carefully water washed including a wash with dilute ammonium chloride solution, the washed silica gel being recovered as a filter cake. A portion of this cake corresponding to 84 grams of $SiO_2$ was slurried in a solution of 34 grams of aluminum chloride hexahydrate and 4 grams of thorium nitrate  $Th(NO_3)_4.4H_2O$ in 1500 cc. of water. Ammonium hydroxide was then added until the liquid was basic to red litmus paper whereby a mixed mass of hydrated alumina and thoria was precipitated in the presence of the suspended silica. The suspension was then directed to a filter and filter cake obtained which after drying at approximately 300° F. was powdered and consolidated. Granules of 6-10 mesh were prepared and calcined at approximately 900° F. prior to contacting with the hydrocarbon vapor.

The catalyst was disposed in a vertical cylindrical chamber and vapors of a Pennsylvania gas oil preheated to a temperature of 932° F. directed downward through the catalytic material in a single pass. The gasoline, gas and fractions heavier than gasoline were separated. The following tabulation is a summary of the results obtained in two runs with the catalytic material, the catalyst being regenerated between runs by the use of air:

|  | Run #1 | Run #2 |
|---|---|---|
| Gasoline 400° F. E. P.: |  |  |
| Volume percent of charge | 26.8 | 25.2 |
| A. P. I. @ 60° F | 59.7 | 59.2 |
| Octane number, motor method | 80.6 | 80.6 |
| Engler distillation: |  |  |
| I. B. P. °F | 92 | 91 |
| 10% °F | 123 |  |
| 20% °F | 142 | 151 |
| 30% °F | 161 | 171 |
| 50% °F | 206 | 216 |
| 70% °F | 277 | 275 |
| 90% °F | 352 | 348 |
| E. P. °F | 399 | 400 |
| Gases (boiling range below +10° C.): |  |  |
| Weight percent of charge | 9.8 | 7.8 |
| Polymerizable gas corresponding to propane and butene content, weight percent charge | 5.6 | 5.3 |
| Gas oil recovered (recycle stock): |  |  |
| Volume percent of charge | 70.0 | 72.2 |
| A. P. I. @ 60° F | 37.1 | 37.4 |

Duplicate runs using quartz chips in place of the catalyst when processing gas oil give a yield of less than 4% gasoline.

Using a similar catalyst as described above, a 400° F. end point Mid-Continent straight-run gasoline having an octane number of 41 was processed in a once-through operation, the oil being vaporized and preheated to a temperature of 1100–1125° F. at substantially atmospheric pressure and then contacted with the silica-alumina-thoria catalyst. The treated vapors were then condensed and the improved gasoline and an olefinic gas separated. The gasoline product corresponded to 80.5 volume % of the straight-run gasoline charged and had an octane number of 61. The gas which comprised 22% by weight of the charge contained 59% of readily polymerizable olefins, i. e., propene and butenes. The high proportion of olefins in the gas is emphasized since it appears to be specific to the present process, i. e., the olefins present in the gas are considerably higher in amount than is ordinarily experienced in strictly thermal reforming or in catalytic processing where dehydrogenating catalysts may be employed.

As a result of polymerizing the olefins and adding the polymer gasoline to the gasoline product obtained in the above reforming operation a total yield of approximately 90% gasoline having approximately a 68 octane number may be obtained. In contrast, similar runs made on a silica-alumina catalyst containing no thoria gave a gasoline of 3 to 4 units lower octane number and produced gas containing 5 to 6% less total olefins.

We claim as our invention:

1. A process for the conversion of hydrocarbons which comprises subjecting the same at conversion temperature within the range of about 800 to 1200° F. to the action of a calcined mixture of precipitated silica, alumina and thoria.

2. A process for the conversion of hydrocarbons which comprises subjecting the same at conversion temperature within the range of about 800 to 1200° F. to the action of a calcined mixture of a major proportion of precipitated silica and minor proportions of precipitated alumina and thoria.

3. A conversion process which comprises contacting hydrocarbon oil at cracking temperature with a calcined mixture of precipitated silica, alumina and thoria.

4. A conversion process which comprises contacting hydrocarbon oil at cracking temperature with a calcined mixture of a major proportion of precipitated silica and minor proportions of precipitated alumina and thoria.

5. A process for producing gasoline which comprises contacting hydrocarbon oil heavier than gasoline at cracking temperature with a calcined mixture of precipitated silica, alumina and thoria.

6. A process for producing gasoline which comprises contacting hydrocarbon oil heavier than gasoline at cracking temperature with a calcined mixture of a major proportion of precipitated silica and minor proportions of precipitated alumina and thoria.

7. A process for producing anti-knock motor fuel which comprises subjecting hydrocarbon distillate containing gasoline fractions at cracking temperature to the action of a calcined mixture of precipitated silica, alumina and thoria.

8. A process for producing antiknock motor fuel which comprises subjecting hydrocarbon distillate containing gasoline fractions at cracking temperature to the action of a calcined mixture of a major proportion of precipitated silica and minor proportions of precipitated alumina and thoria.

9. A catalyst suitable for accelerating hydrocarbon conversion reactions consisting essentially of a calcined mixture of precipitated silica, alumina and thoria.

10. A catalyst suitable for accelerating hydrocarbon conversion reactions consisting essentially of a calcined mixture of a major proportion of precipitated silica and minor proportions of precipitated alumina and thoria.

CHARLES L. THOMAS.
HERMAN S. BLOCH.